United States Patent
Kohli

(10) Patent No.: US 8,312,417 B2
(45) Date of Patent: Nov. 13, 2012

(54) USING DYNAMIC CALL GRAPHS FOR CREATING STATE MACHINES

(75) Inventor: Sandeep Kohli, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1035 days.

(21) Appl. No.: 11/750,712

(22) Filed: May 18, 2007

(65) Prior Publication Data

US 2008/0288931 A1 Nov. 20, 2008

(51) Int. Cl.
*G06F 9/44* (2006.01)
(52) U.S. Cl. .................................................. 717/104
(58) Field of Classification Search .................. None
See application file for complete search history.

(56) References Cited

U.S. PATENT DOCUMENTS

| | | | |
|---|---|---|---|
| 6,029,004 A | 2/2000 | Bortnikov et al. | |
| 6,240,549 B1 * | 5/2001 | Hamada et al. | 717/130 |
| 2003/0056199 A1 * | 3/2003 | Li et al. | 717/127 |
| 2003/0126506 A1 * | 7/2003 | Lin | 714/38 |
| 2003/0233600 A1 * | 12/2003 | Hartman et al. | 714/32 |
| 2004/0034848 A1 | 2/2004 | Moore et al. | |
| 2004/0143756 A1 * | 7/2004 | Munson et al. | 713/200 |
| 2006/0048093 A1 | 3/2006 | Jain et al. | |
| 2007/0074182 A1 * | 3/2007 | Hinchey et al. | 717/136 |
| 2007/0094192 A1 * | 4/2007 | Aurora et al. | 706/46 |

* cited by examiner

*Primary Examiner* — Ted T Vo
*Assistant Examiner* — Adam R Banes
(74) *Attorney, Agent, or Firm* — Hamilton, Brook, Smith & Reynolds, P.C.

(57) ABSTRACT

A method and system capable of creating UML protocol state machine for classes and interfaces of a software, by instrumenting the software to obtain a call graph comprising classes and interfaces and respective values associated with class variables and interface variables; identifying particular classes and interfaces in the call graph; identifying call patterns from the call graph to generate a protocol state machine.

9 Claims, 4 Drawing Sheets

USING DYNAMIC CALL GRAPHS FOR CREATING STATE MACHINES

FIELD OF THE INVENTION

This invention relates to a method for learning using existing software classes and interfaces and using dynamic call graphs for creating probable protocol state machines for classes and interfaces for the software.

BACKGROUND OF THE INVENTION

Software developments have become increasingly large, diverse and complex in recent years. Because of this, extending the life-span of software has become a challenging problem. For example, object-oriented technology offers one solution. By improving the modularity and readability of software it helps us to understand the structure of the software and to maintain, modify and extend it. Various techniques can be used for learning from existing software and such techniques used commonly are adapted to learn various aspects of the software itself and the stages involved in the software development. A commonly used method of learning includes drawing conclusions by users, which includes programmers, designers, testers etc., from what has been done with a particular software especially when similar situation are encountered. Such learning leads to drawing conclusions and/or opinions before implementing any new software development or making any improvements to existing software. Moreover, in the filed of learning, technology has entered a phase of intense work on standardization of learning technology descriptions of various kinds.

For example design patterns are used to overcome this problem. Design patterns are abstract descriptions of object-oriented designs which appear repeatedly and which have succeeded as solutions to past design problems. They are useful in achieving flexible and extensible design which makes it easy to make future changes and modifications. However disordered application of design patterns to a piece of software often makes its design complicated and reduces its performance.

An embodiment of a method and apparatus for modular reordering of portions of a computer program based on profile data is disclosed in U.S. Pat. No. 6,029,004. A global call graph is initially constructed from profile data. From the information in the global call graph, an intramodular call graph is generated for each module. Reordering techniques are used to reorder the procedures in each module according to the profile data in each intramodular call graph. An intermodular call graph is generated from the information in the global call graph. Reordering techniques are used to reorder the modules in the computer program. By reordering procedures within modules, then reordering the modules enhanced performance is achieved without reordering procedures across module boundaries. Respecting module boundaries enhances the maintainability of the computer program by allowing a module to be replaced without adversely affecting the other modules. Such compiler optimizations of a program sequence generally involve building a directed acyclic graph (DAG) or a dependence graph a single class or interface is not addressed.

A systematic methodology is therefore required to effectively construct flexible and extensible software. Without a way to improve the method for learning from existing software by a dynamic call graph for creating probable protocol state machines for classes and interfaces, the promise of this technology may never be fully achieved.

SUMMARY OF THE INVENTION

Accordingly, the present invention provides a method and system for generating protocol state machines from software that is currently executing (running), preferably during instrumentation. A UML protocol state machine for classes and interfaces of software is created during instrumentation of the software to obtain a call graph and values associated with class variables. The software is executed to generate the call graph and class variable information, and particular classes and interfaces in the call graph are identified. Further, call patterns from the call graph to generate a protocol state machine are identified and checked with the sequence of execution of all threads associated in the software before generating the protocol state machine. On determination that the threads may or may not follow the predefined sequence, a new protocol state machine is created which reflects the out of order sequences as optional elements. The class attributes before the call pattern and the class attributes after the call pattern are checked, and the pre and post conditions associated with the class attributed in refining the UML protocol state machine are inferred. Other embodiments are also disclosed. An advantage of that a user chooses an interface in a programming language and request for creating a protocol state machine, and depending on the level of instrumentation involved a suitable and detailed protocol state machine can be constructed.

DETAILED DESCRIPTION OF THE INVENTION

Figure 1:
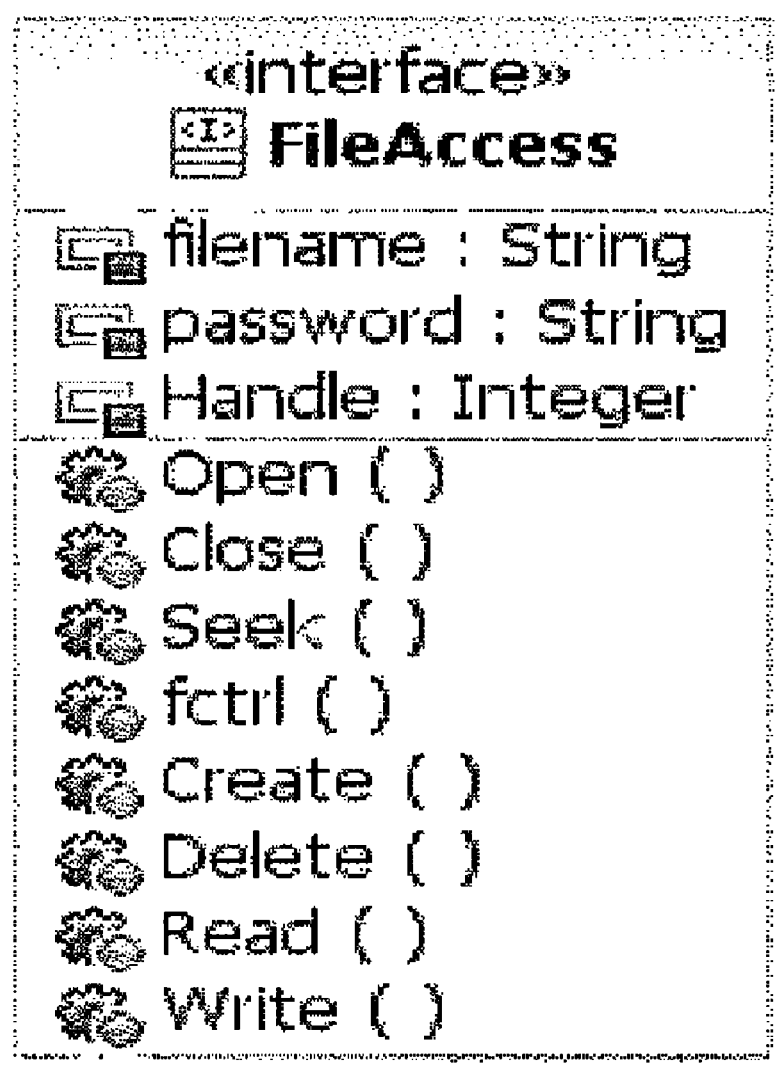
FIG. 1 illustrates an exemplary embodiment of a file access interface 100.

Where reference is made in any one or more of the accompanying drawings to steps and/or features, which have the same reference numerals, those steps and/or features have for the purposes of this description the same function(s) or operation(s), unless the contrary intention appears. The term "software", "program", "code" and "instruction" are used synonymously. Other equivalent expressions to the above expression would be apparent to a person skilled in the art. The term state machine, protocol state machine, unified modelling language (UML) protocol state machine or UML state machine are used synonymously.

FIG. 1 illustrates an exemplary embodiment of a file access interface 100. File access interface 100 illustrates that a number of function calls are implemented, preferably during instrumentation. The class variables and the associated values of the class variables are illustrated. For example, file name and password are class variables having string values and handle is a class variable having an associated value as integer. However, the file access interface 100 does not specify how the function calls defined in the interface are to be used. For example, to determine whether a call to the function read( ) should be preceded by a call to the function open( ) call or not amongst the several other function calls that are available within that interface. Each function call is configured to perform an appropriate task as defined by the function.

Figure 2:
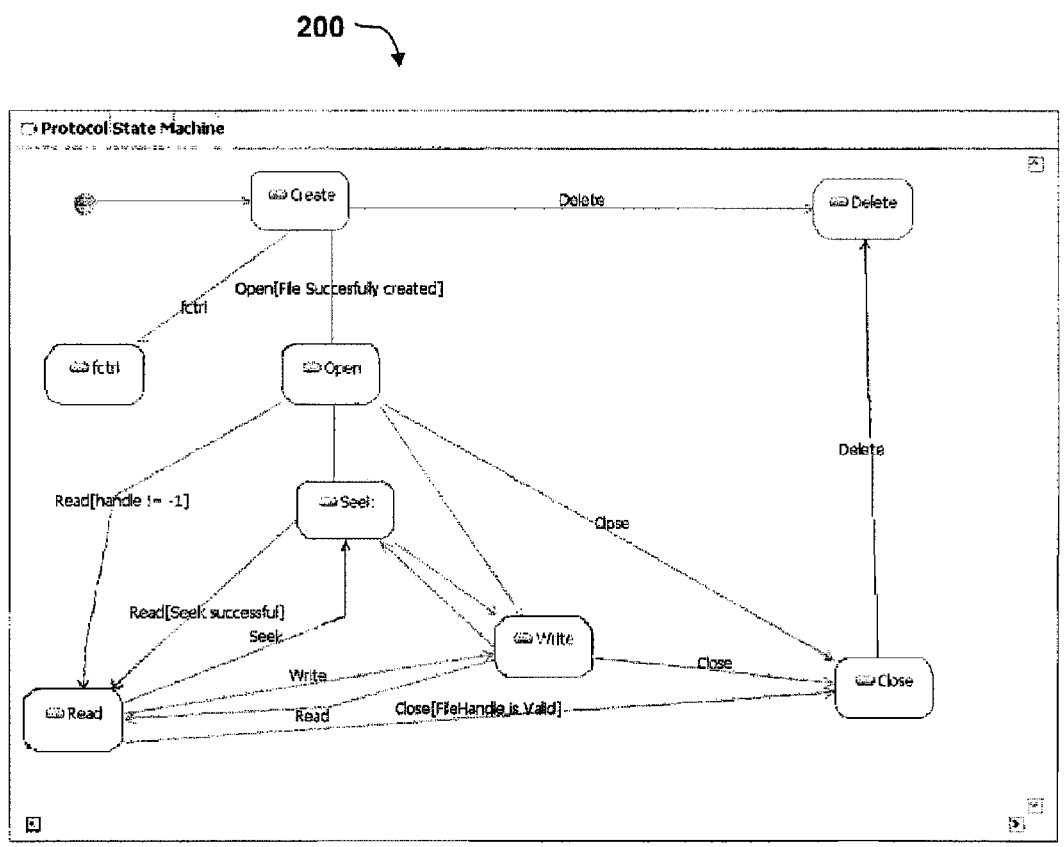
FIG. 2 illustrates an exemplary embodiment of a protocol state machine 200 associated with the file access interface of FIG. 1.

FIG. 2 illustrates an exemplary embodiment of a protocol state machine 200 associated with the file access interface of FIG. 1. FIG. 2 illustrates a typical sequence of flow between various operations of the file access interface 100. The protocol state machine 200 indicates any pre-condition or post condition for a given function call. For example, as illustrated, for a call to the function open( ), the precondition is that the file was created previously, preferably successfully. Each of these pre-conditions can be easily determined from the protocol state machine 200. What programmers look for when programming a given function and/or method is usage of function and/or method like read( ), write( ) etc., and all references associated with such function in a given interface, such as the one described previously such as a file access interface. This is a way to check for all the necessary pre-conditions and post-conditions before any of the function/methods can be invoked. For example, if there a requirement to know if a call to the function open( ) has to be present before a call to the function read( ) or whether a call to the function read( ) to directly read from a file can be executed.

In one embodiment, a User may choose an interface in any programming language and request for building of a protocol state machine for the chosen interface. Depending on the level of instrumentation involved for the software a detailed protocol state machine can be built. The invention provides a method for automating learning from existing software and generating a suitable UML protocol state machine from that learning. The method efficiently instruments software and is configured to obtain information pertaining to specific classes and/or interfaces, and display this information for the class and/or interface in the form of a standard diagram, where an advantage being that diagrams are easily comprehendible. The diagram mentioned above is a UML2 protocol state machine which is configured to describe the external behaviors of the class and/or interface with regards to any other classes and/or interfaces in the system under consideration.

Figure 3:
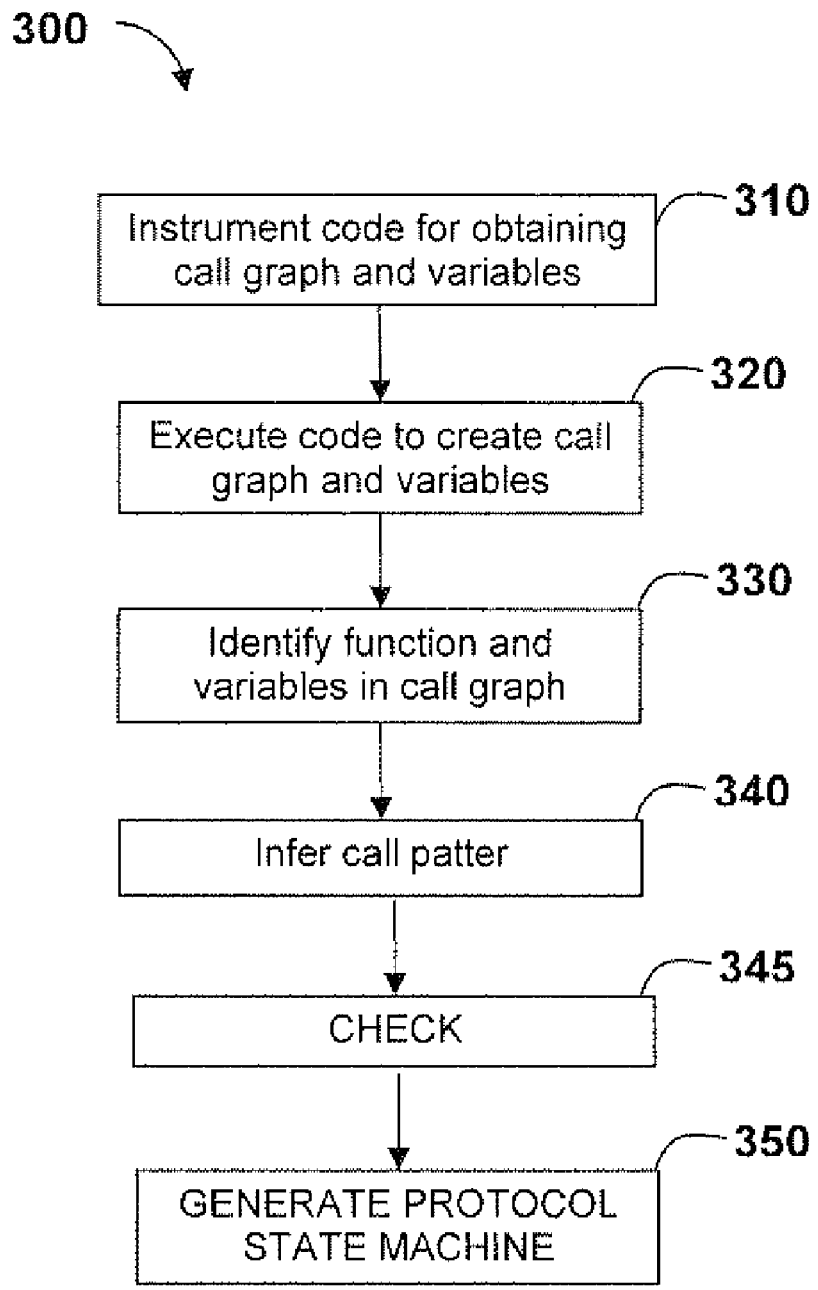
FIG. 3 illustrates an exemplary embodiment of a flowchart 300 in accordance with the invention.

FIG. 3 illustrates an exemplary embodiment of a flowchart 300 in accordance with the invention. The invention related to generate a UML protocol state machine diagrams from running an instrumented code. The term instrumented is known to a person skilled in the art. A probable protocol state machine may be created when instrumenting a running code and optional features may be considered as non-option if such options commonly occur in every run of the protocol state machine. This protocol state machine can be refined over a period of multiple iterations as more and more data is accumulated.

The algorithm associated with the method may be defined in terms of the following steps
    i. In 310, the software (code) is instrumented to obtain the call graph. Additionally the code is instrumented to get the value of various class variables and/or interface variables.
    ii. In 320, the code is then run (executed) to generate the call graph and variable information associated with the call graph
    iii. In 330, all the functions and/or methods related to a particular class and/or interface are identified in the call graph.
    iv. In 340, the call pattern is inferred, for example, if it is observed that in all the threads of execution, the open( ) function call proceeds the read( ) function call, then the protocol state machine is drawn accordingly. However, if it is observed that, even in one case, the open( ) function call doesn't precede a read( ) function call, then the protocol state machine will be different, where the open( ) call may be optional reflected in the protocol state machine.
    v. In 345, additionally a check is made to determine if class attributes have changed before or after the call and if it sees a pattern of change in class variables. For example, changes from null to non-null. The pre-conditions and post-conditions are put in the protocol state machine accordingly. Any contradiction, such as say in one case the attribute is null before and after the call, will lead to an inference that these are not the proper pre-conditions or post-conditions.
    vi. In 350, the generated protocol state machine is then attached to the class and/or interface and can be opened in a tool like Rational™ Software Architect, which supports UML diagrams. This can be customized to be generated in a different format to suite whatever diagramming surface the tool supports. The protocol state machine generated is associated with the classes and/or interfaces that are under observation.

Since the instrumentation is based on running code, it is assumed that the protocol state machine will accurately reflect the protocol to a large extent. The algorithm will update the protocol state machine as more and more data is obtained based on different runs. In one embodiment, the call patterns and associated information can be stored in a repository, creating a historical repository which can be advantageously used in generating the protocol state machine. The UML protocol state machine may be updated and/or refined as more and more runs of the instrumented software are made. The historical repository is used to update the protocol state machine.

Figure 4:
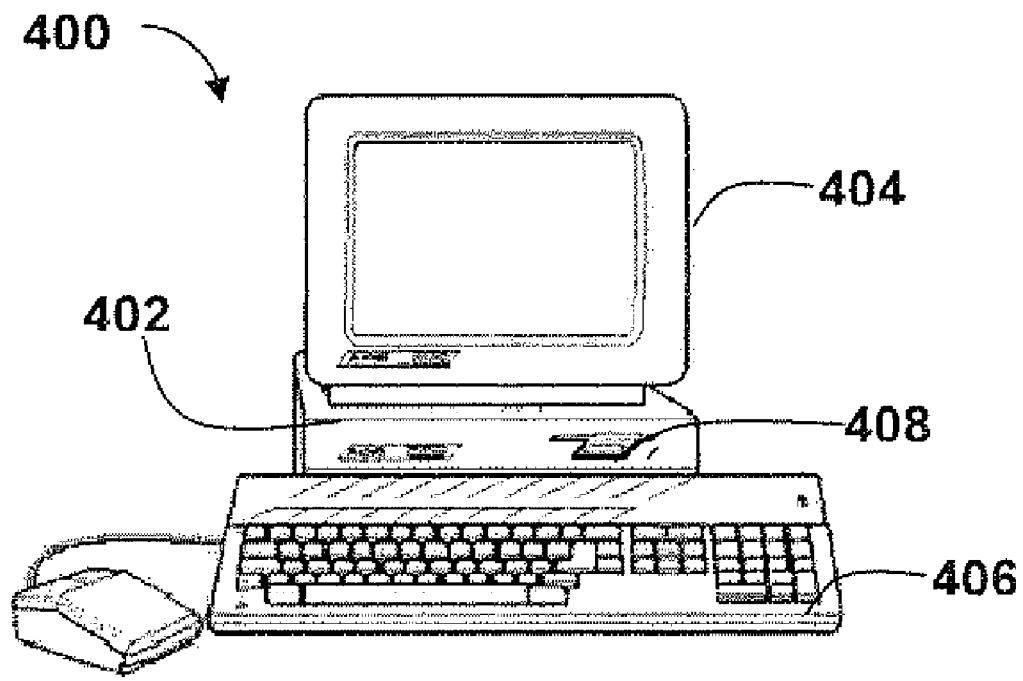
FIG. 4 illustrates an exemplary embodiment of a system 400 on which the method of FIG. 3 may be implemented.

FIG. 4 illustrates an exemplary embodiment of a system 400 on which the method of FIG. 3 may be implemented. The system 400 preferably a processing system or a computing system, include and are not limited a variety of electronic devices such as desktop computers, application servers, web servers, database servers and the like and portable electronic devices such as mobile phones, personal digital assistants (PDAs), pocket personal computers, laptop computers, and the like, which are capable of instrumenting software and generating a UML protocol state machine. It should be apparent to a person skilled in the art that any device, e.g. electronic devices, portable electronic devices, handheld electronic devices and the like, which includes at least a processor and a memory configured execute scripts falls within the scope of the present invention.

The system 400 includes at least a processor and a memory in which the present invention may be implemented is depicted in accordance with one embodiment. The system 400 depicted includes a system unit 402, which further includes essential hardware components such as a microprocessors, memory, connectors, system bus, power unit etc (some of which are not shown in the figure), a video display terminal 404, an input device 406, the input device including a keyboard, mouse, a joystick, touchpad, touch screen, trackball, microphone, etc., and storage devices 408, which may include floppy drives and other types of permanent and removable storage media. Although the depicted representation shows a stand alone system 400, further embodiments of the present invention may be implemented in other types of systems 400, coupled over a network. For example a wired network, wireless network work or a combination thereof. The system 400 also preferably includes a graphical user interface (GUI) that may be implemented by means of systems software residing in computer readable media in operation within the system.

The memory associated with any system 400 is typically is an electronic holding place for instructions and/or data accessed, such as a semiconductor device e.g. random access memory (RAM), such that microprocessor of the system 400 can access the instruction and/or data rather quickly. When the system is in normal operation, the memory usually contains the main parts of the operating system and some or all of the application programs and related data that are being used by the computing system. Accessing data via the memory is faster than reading from a hard drive, so having a larger RAM makes it quick to retrieve recently accessed files, applications, and other data. Further, all programs must be run through the memory before they can be used. The system unit 402 typically containing these components is used for processing and/or executing the software, in this case the scripts. The input device 406 is to record the user input and data may be entered via this input device 406 to perform specific functions. The video display terminal 404 is used to display the results to the user, for example the recorded input, the changed input, the associated actions, the responses etc.

In one embodiment, the system 400 is capable of executing software, specifically instrumenting the software for obtaining a call graph and values associated with class variables of the software, and identifying particular classes and interfaces in the call graph, further configured for identifying the call pattern from the call graph to generate a protocol state machine, the details of which have been described previously.

In a further embodiment, a computer program product comprising a computer readable medium having a computer readable program comprising software, wherein the computer readable program when executed on a computer causes the computer to create UML protocol state machine for classes and interfaces which have been described previously.

For those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention. The system depicted in FIG. 1 may be, for example, an IBM eServer pSeries system, a product of International Business Machines Corporation in Armonk, N.Y., running the Advanced Interactive Executive (AIX) operating system or LINUX operating system.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems, where such software may be advantageously executed.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention. Therefore, it is desired that the embodiments described herein be considered in all respects as illustrative, not restrictive, and that reference be made to the appended claims for determining the scope of the invention.

Although the invention has been described with reference to the embodiments described above, it will be evident that other embodiments may be alternatively used to achieve the same object. The scope of the invention is not limited to the embodiments described above, but can also be applied to software programs and computer program products in general. It should be noted that the above-mentioned embodiments illustrate rather than limit the invention and that those skilled in the art will be able to design alternative embodiments without departing from the scope of the appended claims. In the claims, any reference signs should not limit the scope of the claim. The invention can be implemented by means of hardware and software comprising several distinct elements.

What is claimed is:

1. A method for creating a UML (Unified Modeling Language) protocol state machine for at least one of an object-oriented programming class and an interface of a software, the method comprising:
   instrumenting the software and processing the instrumented software to generate a call log for the software;
   using the call log, (i) creating a call graph for the at least one of an object-oriented programming class and an interface of the software, and (ii) identifying a plurality of variable values of the class or interface, the call graph comprising an identification of call patterns for a plurality of functions of the class or interface; and
   generating a probable UML protocol state machine for the class or interface based on the identified call patterns, the generated probable UML protocol state machine reflecting protocol and describing external behaviors of the class or interface with regard to other classes or interfaces in the software, wherein the generated probable UML protocol state machine for the class or interface of the software as generated by the created call graph indicates any combination of:
   pre-conditions for function calls of the functions in the plurality of functions of the class or interface,
   post-conditions for function calls of the functions in the plurality of functions of the class or interface, and
   references associated with said functions,
   such that the UML protocol state machine sufficiently provides details of the class or interface to enhance the development of the software.

2. The method of claim 1, wherein the step of generating includes:
   using a sequence of execution of all threads associated in the software to generate the UML protocol state machine.

3. The method of claim 2, wherein on determination that the threads do not follow a predefined sequence, creating a new UML protocol state machine reflecting out of order sequences as optional elements.

4. The method of claim 2, further comprising:
inferring pre and post conditions associated with at least one class attribute, based on class attributes before and after at least one function call, to refine the UML protocol state machine.

5. The method of claim 1, wherein the call patterns are updated in a repository and the call patterns in the repository are used to update the UML protocol state machine.

6. A system comprising:
a processor;
a computer readable medium coupled to the processor; and
computer code encoded in the computer readable medium and executable by the processor to cause the processor to:
instrument a software program and process the instrumented software program to generate a call log for the software program;
use the call log to create a call graph for at least one of an object-oriented programming class and an interface of the software program, and to identify a plurality of variable values of the class or interface, the call graph comprising an identification of call patterns for a plurality of functions of the class or interface; and
generate a probable UML (Unified Modeling Language) protocol state machine for the class or interface based on the identified call patterns, the generated probable UML protocol state machine reflecting protocol and describing external behaviors of the class or interface with regard to other classes or interfaces in the software program, and as generated by the created call graph, the probable UML protocol state machine indicating any combination of:
pre-conditions for function calls of the functions in the plurality of functions of the class or interface,
post-conditions for function calls of the functions in the plurality of functions of the class or interface, and
references associated with said functions,
such that the UML protocol state machine sufficiently provides details of the class or interface to enhance development of the the software program.

7. The system of claim 6, wherein computer code encoded in the computer readable medium and executable by the processor to cause the processor to generate the UML protocol state machine includes computer code encoded to cause the processor to: use a sequence of execution of all threads associated in the software program to generate the UML protocol state machine, and on determination that the threads do not follow a predefined sequence, create a new UML protocol state machine reflecting out of order sequences as optional elements.

8. The system of claim 6, further comprising software encoded in the computer readable medium and executable by the processor to cause the processor to: infer pre and post conditions associated with at least one class attribute, based on class attributes before and after at least one function call, to refine the UML protocol state machine.

9. A computer program product comprising a non-transitory computer readable medium having a computer readable program comprising software, wherein the computer readable program when executed on a computer causes the computer to:
instrument a software program and process the instrumented software program to generate a call log for the software program;
use the call log to create a call graph for at least one of an object oriented programming class and an interface of the software program, and to identify a plurality of variable values of the class or interface, the call graph comprising an identification of call patterns for a plurality of functions of the class or interface;
generate a first UML (Unified Modeling Language) protocol state machine for the class or interface based on the identified call patterns, the first UML protocol state machine describes external behaviors of the class or interface with regard to other classes or interfaces in the software program, and the first UML protocol state machine reflects protocol indicating any combination of:
pre-conditions for function calls of the functions in the plurality of functions of the class or interface,
post-conditions for function calls of the functions in the plurality of functions of the class or interface, and
references associated with said functions;
wherein a sequence of execution of all threads associated in the software program is used to generate the first UML protocol state machine, and on determination that the threads do not follow a predefined sequence, create a second UML protocol state machine reflecting out of order sequences as optional elements, the second UML protocol state machine being different from the first UML protocol state machine; and
infer pre and post conditions associated with at least one class attribute, based on class attributes before and after at least one function call, to update the first UML protocol state machine, the first and second UML protocol state machines for the class or interface of the software program sufficiently providing details of the class or interface to enhance development of the software program.

* * * * *